Aug. 28, 1923.

G. TREFS 1,466,074

LOOSE WHEEL CONSTRUCTION

Filed March 10, 1922

WITNESS
Wm L Bell

INVENTOR,
George Trefs
BY
John Steward
ATTORNEY.

Patented Aug. 28, 1923.

1,466,074

UNITED STATES PATENT OFFICE.

GEORGE TREFS, OF MONTVILLE, NEW JERSEY.

LOOSE-WHEEL CONSTRUCTION.

Application filed March 10, 1922. Serial No. 542,322.

*To all whom it may concern:*

Be it known that I, GEORGE TREFS, a citizen of the United States, residing at Montville, in the county of Morris and State of New Jersey, have invented certain new and useful Improvements in Loose-Wheel Constructions, of which the following is a specification.

This invention relates to free-wheel constructions and it has for its object to provide a free-wheel construction in which the bearing for the wheel, herein shown as a pulley, shall form a housing or container for lubricant, such as grease, and as such shall possess certain advantages in the way of applicability in the place of any existing free-wheel, facility of assembling with the shaft forming an axial support, ample capacity for lubricant, and, simplicity of construction.

Figure 1:
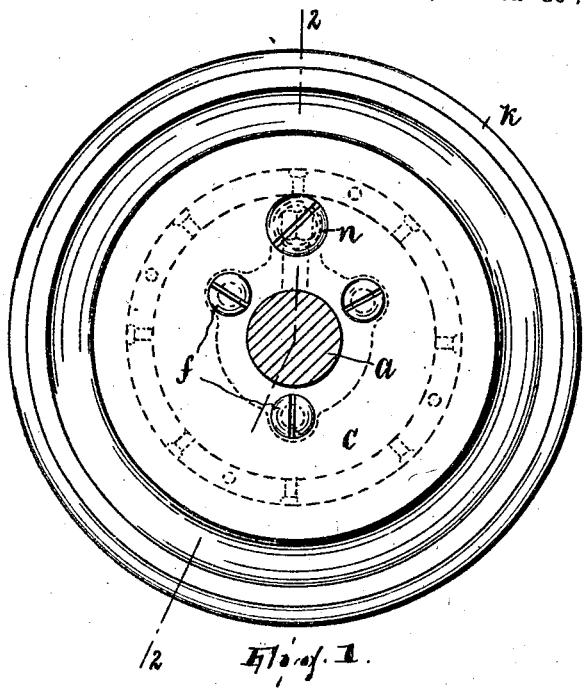
Fig. 1 is a side elevation of the improved free-wheel construction.
Figure 2:
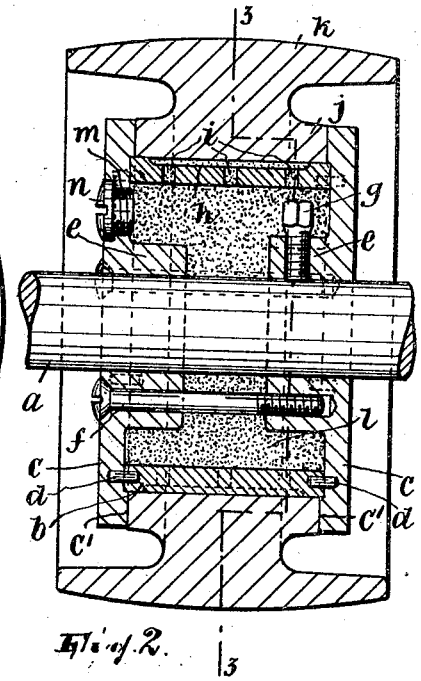
Fig. 2 is a section on line 2—2, Fig. 1.
Figure 3:
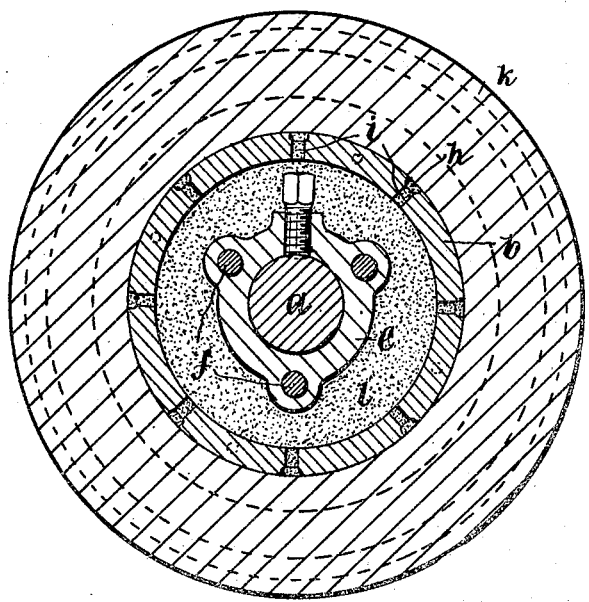
Fig. 3 is a section on line 3—3, Fig. 2.

Let $a$ designate any shaft on which a free-wheel, such as a pulley, would be mounted.

A housing is secured on this shaft, according to my invention, which in the example illustrated is constructed as follows: There is a sleeve $b$, which, exteriorly, at least, is cylindrical, thus forming a journal. Abutting the ends of this sleeve and held clamped thereagainst are two disks or heads $c$ which are penetrated by the shaft, the heads being here circular and penetrated centrally by the shaft; the heads have inside marginal raised fillets or low-lying flanges $c'$ which snugly fit around the sleeve ends and so center the sleeve and which are flat and so form therewith an exterior bearing channel. The sleeve and heads may be fixed positively against relative rotation by dowels $d$. The heads have inward hubs or bosses $e$ of appreciably less diameter than the sleeve and the means to clamp them together is here shown to be screws $f$ which extend parallel with the shaft and pass freely through one hub and are tapped into the other. $g$ designates a set-screw which is tapped into one of the hubs and so secures the housing against rotation relatively to the shaft. The sleeve has parallel with the shaft and in its periphery lubricant grooves $h$, and it is penetrated by lubricant feed-holes $i$ communicating with these grooves.

In the bearing channel formed around the housing is journaled the hub $j$ of the wheel (here a pulley) $k$, said hub fitting the channel snugly.

The housing may be supplied with the lubricant $l$ through an aperture $m$ having a screw plug $n$.

By forming the housing as herein set forth I obtain an ample container for lubricant within the pulley journal and make it possible to distribute the lubricant uniformly over the full width of the surfaces to be lubricated, as by the holes $i$ and grooves $h$. Moreover, the device is readily applicable to any shaft in the place of an existing free-wheel thereon, assembling being readily accomplished by first securing one head $c$ on the shaft by means of set screw $e$, then abutting against and centering the sleeve with respect to said head, then fitting the pulley over the sleeve, and finally abutting the other head against the sleeve in the centered relation and driving home the screws $f$.

Having thus fully described my invention, what I claim as new and desire to secure by Letters Patent is:—

1. In combination, a shaft, a housing secured thereon including spaced heads penetrated by the shaft, a sleeve surrounding and spaced from the shaft and interposed between the heads and forming exteriorly a bearing and means, extending between the shaft and sleeve and connecting the heads, for clamping the heads and sleeve together, and a wheel journaled on said bearing, the housing being adapted to contain a lubricant and the sleeve having means to pass the lubricant therethrough to its bearing.

2. In combination, a shaft, a housing secured thereon including spaced heads having inwardly projecting hubs penetrated by the shaft, means arranged in one hub for securing the corresponding head to the shaft, a sleeve surrounding and spaced from the shaft and hubs and interposed between the heads, and means, extending between the shaft and sleeve and connecting the hubs, for clamping the heads and sleeve together, and a wheel journaled on said bearing, the housing being adapted to contain a lubricant and the sleeve having means to pass the lubricant therethrough to its bearing.

3. In combination, a shaft, a housing secured thereon and including spaced heads penetrated by the shaft and a sleeve surrounding and spaced from the shaft and held between the heads, said heads projecting peripherally beyond the sleeve and having inside raised fillets snugly fitting around the sleeve ends and said fillets and the periphery of said sleeve together forming a peripheral bearing channel, and a wheel journaled in said bearing channel, said housing being adapted to contain lubricant and the sleeve having means to pass the lubricant therethrough to said channel.

4. In combination, a shaft, a housing secured thereon and including spaced heads penetrated by the shaft and a cylindrical sleeve surrounding and spaced from the shaft and held between the heads, said heads having inward continuous fillets snugly fitting around the sleeve ends and forming with the exterior of the sleeve a peripheral bearing channel, and a wheel journaled in said bearing channel, said housing being adapted to contain lubricant and the sleeve having means to pass the lubricant therethrough to the channel.

In testimony whereof I affix my signature.

GEORGE TREFS.